(12) United States Patent  
Reimann

(10) Patent No.: US 11,494,157 B2
(45) Date of Patent: Nov. 8, 2022

(54) EXTENDING PLAYBACK WITH CORRESPONDING MEDIA

(71) Applicant: Sonos, Inc., Santa Barbara, CA (US)

(72) Inventor: Robert Reimann, Newton, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 17/120,611

(22) Filed: Dec. 14, 2020

(65) Prior Publication Data

US 2021/0271444 A1 Sep. 2, 2021

Related U.S. Application Data

(63) Continuation of application No. 16/295,444, filed on Mar. 7, 2019, now Pat. No. 10,866,782, which is a
(Continued)

(51) Int. Cl.
*G06F 3/16* (2006.01)
*G06F 16/638* (2019.01)
(Continued)

(52) U.S. Cl.
CPC ............ *G06F 3/16* (2013.01); *G06F 16/4387* (2019.01); *G06F 16/639* (2019.01);
(Continued)

(58) Field of Classification Search
CPC ...... G06F 3/16; G06F 16/4387; G06F 16/639; H04N 21/26258; H04N 21/43615; H04N 21/4825; H04N 21/4826; H04N 21/6175
See application file for complete search history.

(56) References Cited

U.S. PATENT DOCUMENTS 5,406,634 A 4/1995 Anderson et al.
5,440,644 A 8/1995 Farinelli et al.
(Continued)

FOREIGN PATENT DOCUMENTS

| EP | 1389853 A1 | 2/2004 |
| WO | 200153994 | 7/2001 |
| WO | 2003093950 A2 | 11/2003 |

OTHER PUBLICATIONS

Advisory Action dated Sep. 2, 2014, issued in connection with U.S. Appl. No. 13/536,154, filed Jun. 28, 2012, 2 pages.
(Continued)

*Primary Examiner* — Joseph Saunders, Jr.
(74) *Attorney, Agent, or Firm* — Fortem IP LLP; Benjamin Urban

(57) ABSTRACT

Embodiments described herein provide for extending media playback. In an example implementation, during playback of one or more first media items populated in a queue, a control system extends playback time of the queue. Extending playback time of the queue may involve determining when the one or more first media items will be finished playing; and before the first media items are finished playing, determining one or more second media items that correspond in substantial likeness to the one or more first media items and sending an instruction that causes the first playback device to insert the determined one or more second media items into the queue such that play time of the queue is extended.

20 Claims, 7 Drawing Sheets

Related U.S. Application Data continuation of application No. 15/979,255, filed on May 14, 2018, now Pat. No. 10,268,441, which is a continuation of application No. 14/815,395, filed on Jul. 31, 2015, now abandoned, which is a continuation of application No. 13/536,154, filed on Jun. 28, 2012, now Pat. No. 9,137,564.

(51) Int. Cl.

| | | |
|---|---|---|
| *G06F 16/438* | (2019.01) | |
| *H04N 21/262* | (2011.01) | |
| *H04N 21/482* | (2011.01) | |
| *H04N 21/61* | (2011.01) | |
| *H04N 21/436* | (2011.01) | |

(52) U.S. Cl.
CPC .. *H04N 21/26258* (2013.01); *H04N 21/43615* (2013.01); *H04N 21/4825* (2013.01); *H04N 21/4826* (2013.01); *H04N 21/6175* (2013.01)

(56) References Cited

U.S. PATENT DOCUMENTS

| | | | |
|---|---|---|---|
| 5,761,320 | A | 6/1998 | Farinelli et al. |
| 5,856,827 | A | 1/1999 | Sudo |
| 5,923,902 | A | 7/1999 | Inagaki |
| 6,002,862 | A | 12/1999 | Takai |
| 6,032,202 | A | 2/2000 | Lea et al. |
| 6,181,316 | B1 | 1/2001 | Little et al. |
| 6,255,961 | B1 | 7/2001 | Van Ryzin et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,587,127 | B1 | 7/2003 | Leeke et al. |
| 6,611,537 | B1 | 8/2003 | Edens et al. |
| 6,631,410 | B1 | 10/2003 | Kowalski et al. |
| 6,728,531 | B1 | 4/2004 | Lee et al. |
| 6,732,155 | B2 | 5/2004 | Meek |
| 6,757,517 | B2 | 6/2004 | Chang |
| 6,778,869 | B2 | 8/2004 | Champion |
| 6,826,283 | B1 | 11/2004 | Wheeler et al. |
| 6,985,694 | B1 | 1/2006 | De Bonet et al. |
| 7,017,118 | B1 | 3/2006 | Carroll |
| 7,020,048 | B2 | 3/2006 | McComas |
| 7,113,833 | B1 | 9/2006 | Brown et al. |
| 7,117,451 | B2 | 10/2006 | Sielken |
| 7,130,608 | B2 | 10/2006 | Hollstrom et al. |
| 7,130,616 | B2 | 10/2006 | Janik |
| 7,143,939 | B2 | 12/2006 | Henzerling |
| 7,187,947 | B1 | 3/2007 | White et al. |
| 7,236,773 | B2 | 6/2007 | Thomas |
| 7,295,548 | B2 | 11/2007 | Blank et al. |
| 7,312,785 | B2 | 12/2007 | Tsu et al. |
| 7,358,960 | B2 | 4/2008 | Mak |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,742,740 | B2 | 6/2010 | Goldberg et al. |
| 7,805,682 | B1 | 9/2010 | Lambourne |
| 7,853,341 | B2 | 12/2010 | McCarty et al. |
| 7,987,294 | B2 | 7/2011 | Bryce et al. |
| 3,014,423 | A1 | 9/2011 | Thaler et al. |
| 8,045,952 | B2 | 10/2011 | Qureshey et al. |
| 8,050,652 | B2 | 11/2011 | Qureshey et al. |
| 8,074,253 | B1 | 12/2011 | Nathan |
| 8,103,009 | B2 | 1/2012 | McCarty et al. |
| 8,131,390 | B2 | 3/2012 | Braithwaite et al. |
| 8,234,395 | B2 | 7/2012 | Millington |
| 8,483,853 | B1 | 7/2013 | Lambourne |
| 9,232,277 | B2 | 1/2016 | Vega-Zayas et al. |
| 9,247,363 | B2 | 1/2016 | Triplett et al. |
| 9,489,383 | B2 | 11/2016 | Hyman et al. |
| 9,501,533 | B2 | 11/2016 | Coburn, IV et al. |
| 9,674,587 | B2 | 6/2017 | Triplett et al. |
| 9,690,466 | B2 | 6/2017 | Coburn |
| 9,703,521 | B2 | 7/2017 | Kumar et al. |
| 9,735,978 | B2 | 8/2017 | Kumar et al. |
| 10,268,352 | B2 | 4/2019 | Coburn, IV et al. |
| 10,715,973 | B2 | 7/2020 | Kumar et al. |
| 2001/0042107 | A1 | 11/2001 | Palm |
| 2002/0002039 | A1 | 1/2002 | Qureshey et al. |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2002/0163361 | A1 | 11/2002 | Parkin |
| 2002/0165921 | A1 | 11/2002 | Sapieyevski |
| 2002/0178191 | A1 | 11/2002 | Sielken |
| 2003/0023741 | A1 | 1/2003 | Tomassetti et al. |
| 2003/0157951 | A1 | 8/2003 | Hasty, Jr. |
| 2003/0210796 | A1 | 11/2003 | McCarty et al. |
| 2003/0221541 | A1 | 12/2003 | Platt |
| 2004/0024478 | A1 | 2/2004 | Hans et al. |
| 2004/0025185 | A1 | 2/2004 | Goci et al. |
| 2004/0078383 | A1 | 4/2004 | Mercer et al. |
| 2004/0078812 | A1 | 4/2004 | Calvert |
| 2004/0215611 | A1 | 10/2004 | Jawa et al. |
| 2004/0261040 | A1 | 12/2004 | Radcliffe et al. |
| 2005/0108320 | A1 | 5/2005 | Lord et al. |
| 2005/0166157 | A1 | 7/2005 | Ollis et al. |
| 2006/0107237 | A1 | 5/2006 | Kim |
| 2006/0168340 | A1 | 7/2006 | Heller et al. |
| 2006/0253782 | A1 | 11/2006 | Stark et al. |
| 2007/0038999 | A1 | 2/2007 | Millington |
| 2007/0061497 | A1* | 3/2007 | Takatsuka ............... G06F 3/165 |
| | | | 711/100 |
| 2007/0142944 | A1 | 6/2007 | Goldberg et al. |
| 2007/0288470 | A1 | 12/2007 | Kauniskangas et al. |
| 2008/0005690 | A1 | 1/2008 | Van Vugt |
| 2008/0016465 | A1 | 1/2008 | Foxenland |
| 2009/0013260 | A1 | 1/2009 | Martin et al. |
| 2009/0228919 | A1 | 9/2009 | Zott et al. |
| 2009/0249222 | A1 | 10/2009 | Schmidt et al. |
| 2011/0004330 | A1 | 1/2011 | Rothkopf et al. |
| 2011/0154198 | A1 | 6/2011 | Bachman et al. |
| 2012/0117586 | A1 | 5/2012 | McCoy et al. |
| 2012/0150614 | A1 | 6/2012 | Dion et al. |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Corrected Notice of Allowance dated Feb. 14, 2018, issued in connection with U.S. Appl. No. 14/815,395, filed Jul. 31, 2015, 5 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Final Office Action dated Jun. 17, 2014, issued in connection with U.S. Appl. No. 13/536,154, filed Jun. 28, 2012, 12 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.

(56) References Cited

OTHER PUBLICATIONS

Non-Final Office Action dated Jan. 14, 2015, issued in connection with U.S. Appl. No. 13/536,154, filed Jun. 28, 2012, 13 pages.
Non-Final Office Action dated Mar. 18, 2020, issued in connection with U.S. Appl. No. 16/295,444, filed Mar. 7, 2019, 6 pages.
Non-Final Office Action dated Apr. 23, 2014, issued in connection with U.S. Appl. No. 13/536,154, filed Jun. 28, 2012, 9 pages.
Non-Final Office Action dated Oct. 3, 2018, issued in connection with U.S. Appl. No. 15/979,255, filed May 14, 2018, 11 pages.
Notice of Allowance dated Aug. 14, 2020, issued in connection with U.S. Appl. No. 16/295,444, filed Mar. 7, 2019, 5 pages.
Notice of Allowance dated Dec. 18, 2018, issued in connection with U.S. Appl. No. 15/979,255, filed May 14, 2018, 5 pages.
Notice of Allowance dated Oct. 20, 2017, issued in connection with U.S. Appl. No. 14/815,395, filed Jul. 31, 2015, 6 pages.
Notice of Allowance dated Jun. 3, 2015, issued in connection with U.S. Appl. No. 13/536,154, filed Jun. 28, 2012, 5 pages.
Palm, Inc., "Handbook for the Palm VII Handheld," May 2000, 311 pages.
Presentations at WinHEC 2000, May 2000, 138 pages.
PRISMIQ, Inc., "PRISMIQ Media Player User Guide," 2003, 44 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

\* cited by examiner

EXTENDING PLAYBACK WITH CORRESPONDING MEDIA

CROSS REFERENCE TO RELATED APPLICATIONS

This application claims priority under 35 U.S.C. § 120 to, and is a continuation of, U.S. non-provisional patent application Ser. No. 16/295,444, filed on Mar. 7, 2019, entitled "Extending Playback With Corresponding Media," which is incorporated herein by reference in its entirety.

U.S. non-provisional patent application Ser. No. 16/295,444 claims priority under 35 U.S.C. § 120 to, and is a continuation of, U.S. non-provisional patent application Ser. No. 15/979,255, filed on May 14, 2018, entitled "Shift to Corresponding Media in a Playback Queue," and issued as U.S. Pat. No. 10,268,441 on Apr. 23, 2019, which is incorporated herein by reference in its entirety.

U.S. non-provisional patent application Ser. No. 15/979,255 claims priority under 35 U.S.C. § 120 to, and is a continuation of, U.S. non-provisional patent application Ser. No. 14/815,395, filed on Jul. 31, 2015, entitled "Shift to Corresponding Media in a Playback Queue," which is incorporated herein by reference in its entirety.

U.S. non-provisional patent application Ser. No. 14/815,395 claims priority under 35 U.S.C. § 120 to, and is a continuation of, U.S. non-provisional patent application Ser. No. 13/536,154, filed on Jun. 28, 2012, entitled "Shift to Corresponding Media in a Playback Queue," issued as U.S. Pat. No. 9,137,564 on Sep. 15, 2015, which is also incorporated herein by reference in its entirety.

FIELD OF THE DISCLOSURE

The disclosure is related to consumer goods and, more particularly, to systems, products, features, services, and other items directed to media playback or some aspect thereof.

BACKGROUND

Technological advancements have increased the accessibility of music content, as well as other types of media, such as television content, movies, and interactive content. For example, a user can access audio, video, or both audio and video content over the Internet through an online store, an Internet radio station, a music service, a movie service, and so on, in addition to the more traditional avenues of accessing audio and video content. Demand for audio, video, and both audio and video content inside and outside of the home continues to increase.

BRIEF DESCRIPTION OF THE DRAWINGS

Features, aspects, and advantages of the presently disclosed technology are better understood with regard to the following description, appended claims, and accompanying drawings where:

Figure 1:
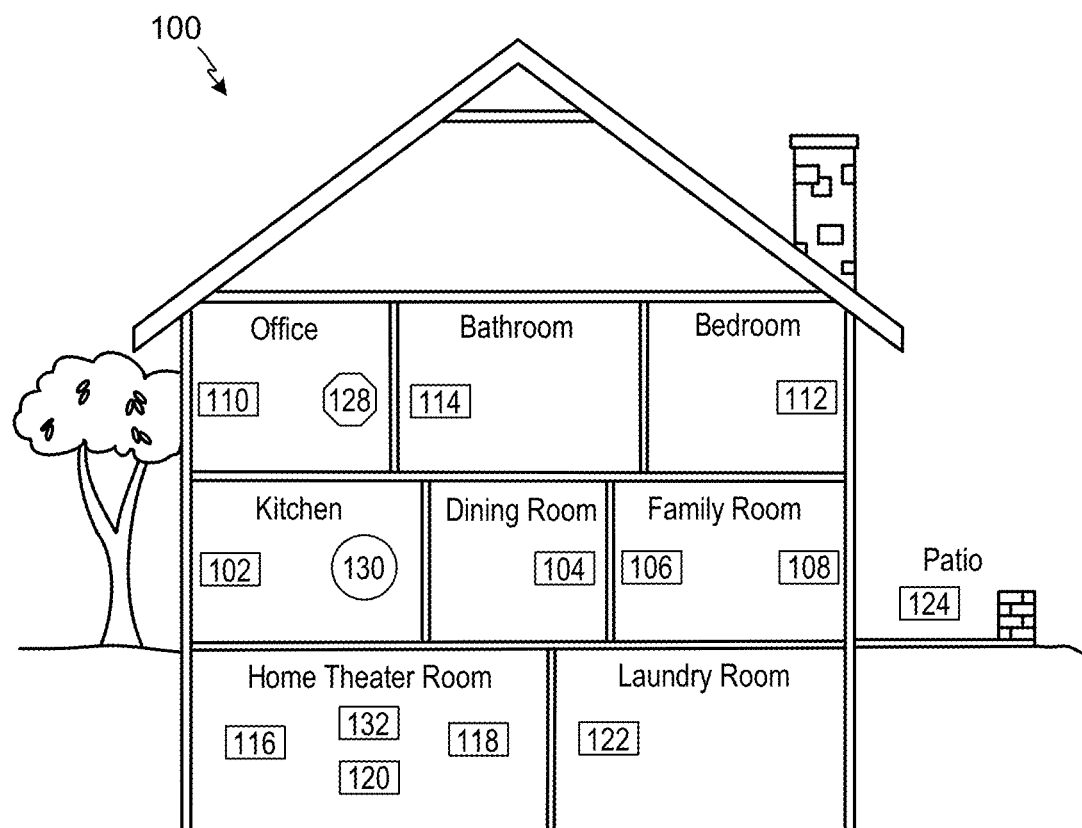
FIG. 1 shows an illustration of an example system in which embodiments of the methods and apparatus disclosed herein can be implemented.

In addition, the drawings are for the purpose of illustrating example embodiments, but it is understood that the present disclosure is not limited to the arrangements and instrumentality shown in the drawings.

DETAILED DESCRIPTION

I. Brief Overview

Embodiments described herein provide for intelligently extending media playback. According to an embodiment, a playback queue for an audio player is established. The playback queue contains one or more playable items, which can be played by the audio player according to the arrangement of the items. At least one additional playable item that corresponds in substantial likeness to the list of playable items is determined, without additional user effort, and placed in the playback queue, which extends play time.

Unlike a traditional playback queue where the audio stops playing when a list of songs or tracks in the queue have been played or are exhausted, in one embodiment, the system automatically shifts to playback audio that is similar to the audio in the queue. In an embodiment, the playback of similar audio includes automatically adding similar songs or tracks to the playback queue to be played. In another embodiment, the playback of similar audio includes automatically playing a streaming station, such as an online radio station, which is similar to the previously played songs or tracks.

In an embodiment, in addition to placing extra playable items at the end of a playback queue, or instead of, the system can place a playable item in between two playable items already in the playback queue. In other words, the system can be configured to inject additional playable items throughout the playback queue.

In an embodiment, the system extends play time by automatically determining and/or playing audio content that is similar to what has been played by the particular player or group of players. In this embodiment, the system determines what audio has actually been played in a zone or zones versus just looking to the audio content in a playback queue, in which for example, a user could have removed songs or tracks during playback. The system may look to what audio has been played over a designated time period (e.g., the last 30 minutes).

According to some embodiments, the playable item that is to be added to extend play time corresponds in substantial likeness to the list of playable items already in the queue and/or played. Substantial likeness is defined herein as having an identifiable similarity. For instance, a song might be classified according to attributes like artist, genre, instrumentation, tonality, ostinato, and so on that can be used to determine similarities.

II. An Example Operating Environment

Referring now to the drawings, in which like numerals can refer to like parts throughout the figures, FIG. 1 shows an example system 100 in which one or more embodiments disclosed herein can be practiced or implemented.

By way of illustration, system 100 represents a home presently configured with multiple zones, though the home could have been configured with only one zone. Each zone in the home, for example, may represent a different room or space, such as an office, bathroom, bedroom, kitchen, dining room, family room, home theater room, utility or laundry room, and patio. A single zone might also include multiple rooms if so configured. One or more of zone players 102-124 are shown in each respective zone of the home. A zone player 102-124, also referred to as a playback device, multimedia unit, speaker, player, and so on, provides audio, video, and/or audiovisual output. Controller 130 provides control to system 100. Controller 130 may be fixed to a zone, or alternatively, mobile such that it can be moved about the zones. System 100 may also include more than one controller 130. System 100 illustrates an example whole house audio system, though it is understood that the technology described herein is not limited to its particular place of application or to an expansive system like a whole house audio system 100 of FIG. 1.

a. Example Zone Players

Figure 2A:
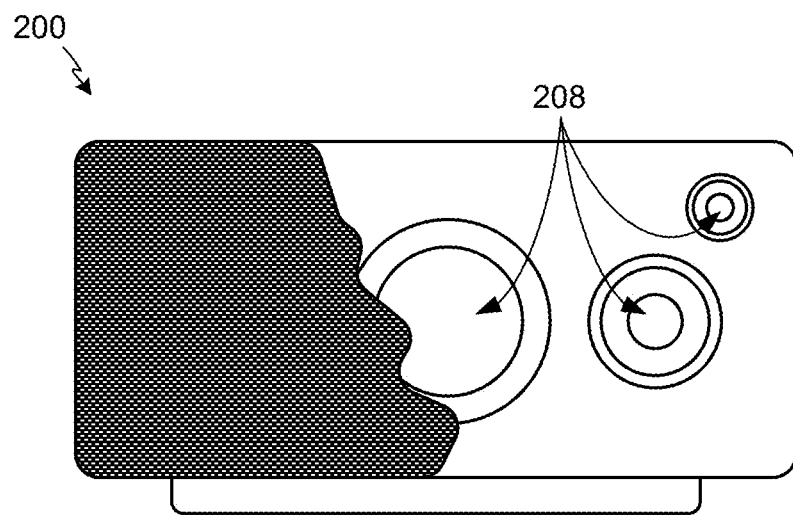
FIG. 2A shows an illustration of an example zone player having a built-in amplifier and speakers.
Figure 2B:
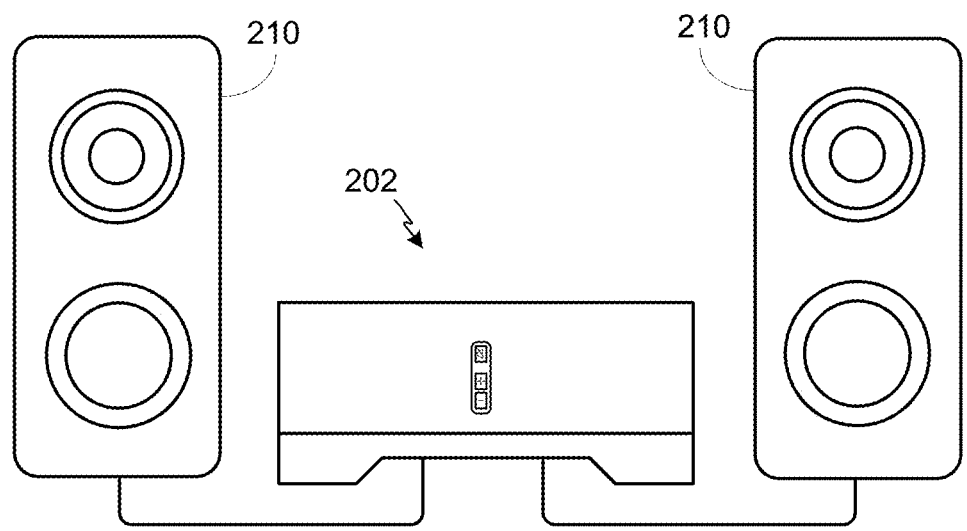
FIG. 2B shows an illustration of an example zone player having a built-in amplifier and connected to external speakers.
Figure 2C:
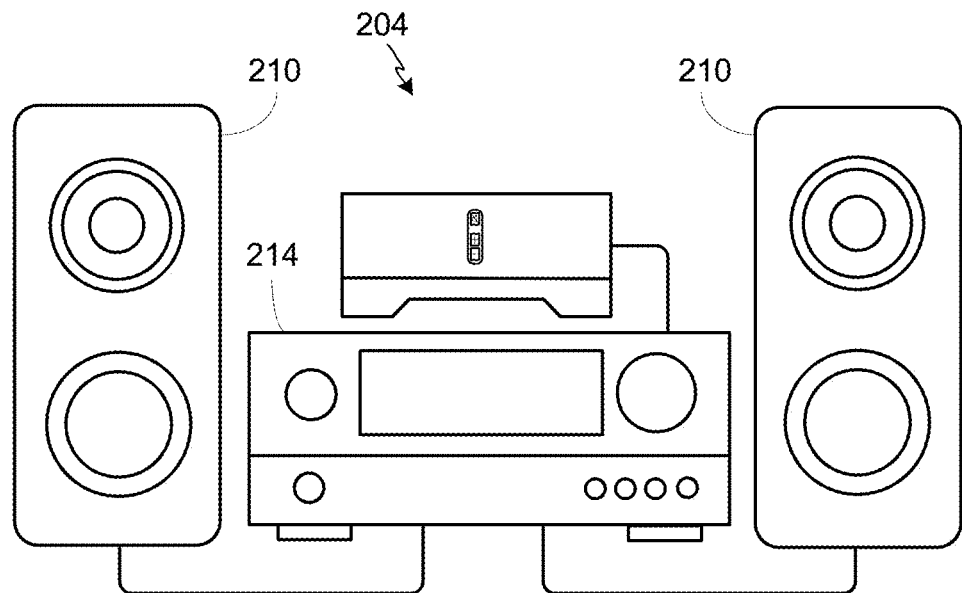
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more speakers. A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 is configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a zone player may contain a playlist or queue of audio items to be played (also referred to herein as a "playback queue"). Each item in the queue may comprise a uniform resource identifier (URI) or some other identifier. The URI or identifier can point the zone player to the audio source. The source might be found on the Internet (e.g., the cloud), locally from another device over data network 128, the controller 130, stored on the zone player itself, or from an audio source communicating directly to the zone player. In some embodiments, the zone player can reproduce the audio itself, send it to another zone player for reproduction, or both where the audio is played by the zone player and one or more additional zone players in synchrony. In some embodiments, the zone player can play a first audio content (or not play at all), while sending a second, different audio content to another zone player(s) for reproduction.

By way of illustration, SONOS, Inc. of Santa Barbara, Calif. presently offers for sale zone players referred to as a "PLAY:5," "PLAY:3," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player can include or interact with a docking station for an Apple iPod™ or similar device.

b. Example Controllers

Figure 3:
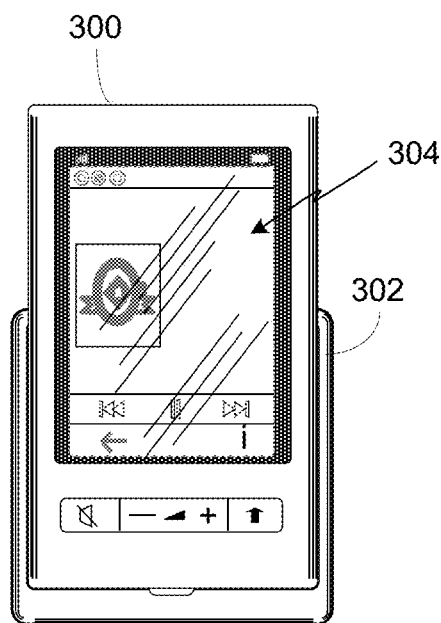
FIG. 3 shows an illustration of an example controller.

FIG. 3 illustrates an example wireless controller 300 in docking station 302. By way of illustration, controller 300 can correspond to controlling device 130 of FIG. 1. Docking station 302, if provided, may be used to charge a battery of controller 300. In some embodiments, controller 300 is provided with a touch screen 304 that allows a user to interact through touch with the controller 300, for example, to retrieve and navigate a playlist of audio items, control operations of one or more zone players, and provide overall control of the system configuration 100. In certain embodiments, any number of controllers can be used to control the system configuration 100. In some embodiments, there can be a limit set on the number of controllers that can control the system configuration 100. The controllers might be wireless like wireless controller 300 or wired to data network 128.

In some embodiments, if more than one controller is used in system 100, then each controller may be coordinated to display common content, and may all be dynamically updated to indicate changes made from a single controller. Coordination can occur, for instance, by a controller periodically requesting a state variable directly or indirectly from one or more zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an iPhone™, iPad™, Android™ powered phone, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by SONOS, Inc. of Santa Barbara, Calif. include a "Controller 200," "Sonos CONTROL," "Sonos® Controller for iPhone," "Sonos® Controller for iPad," "Sonos® Controller for Android, "Sonos® Controller for Mac or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players 102-124 are wirelessly coupled to data network 128 using a non-mesh topology. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SonosNet protocol, developed by SONOS, Inc. of Santa Barbara. SonosNet represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, music on a zone player itself may be accessed and a played. In some embodiments, music from a personal library stored on a computer or networked-attached storage (NAS) may be accessed via the data network 128 and played. In some embodiments, Internet radio stations, shows, and podcasts can be accessed via the data network 128. Music or cloud services that let a user stream and/or download music and audio content can be accessed via the data network 128. Further, music can be obtained from traditional sources, such as a turntable or CD player, via a line-in connection to a zone player, for example. Audio content can also be accessed using a different protocol, such as AirPlay™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Zone Players

Figure 4:
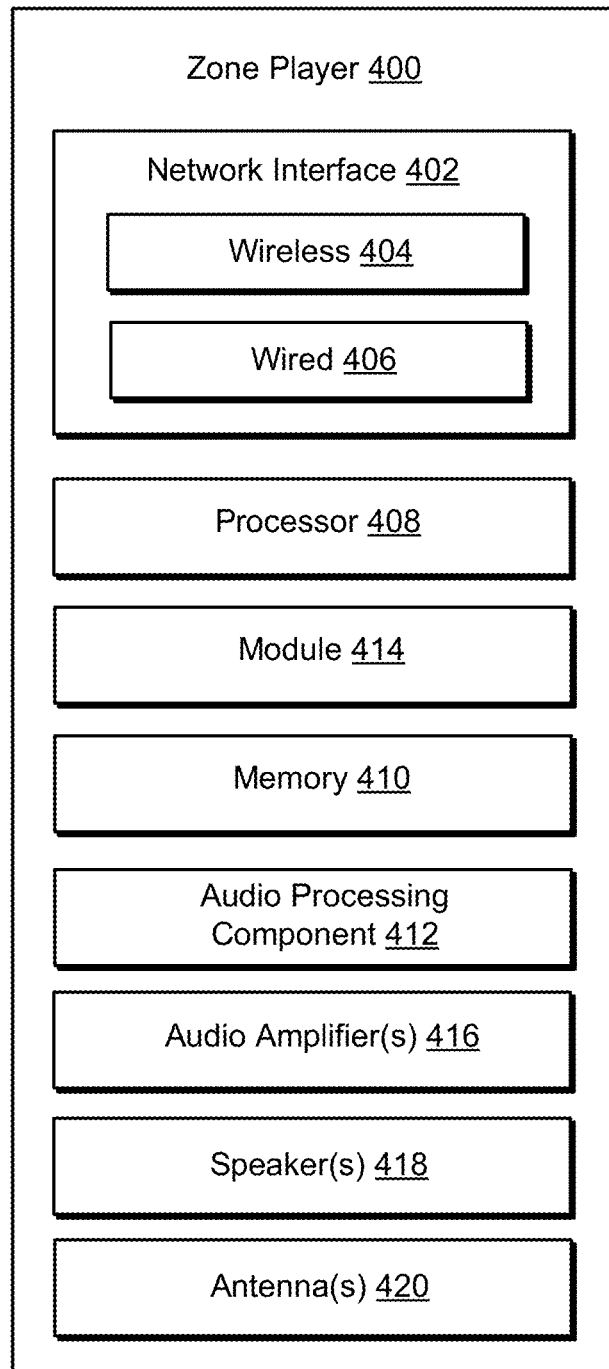
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, or 802.15). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5, is a zone player with a built-in amplifier and speakers that is capable of retrieving audio directly from the source, such as on the Internet or on the local network, for example. In particular, the PLAY:5 is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies, but from different channels of audio. Audio from Internet radio stations, online music and video services, downloaded music, analog audio inputs, television, DVD, and so on, can be played from the PLAY:5.

IV. Controller

Figure 5:
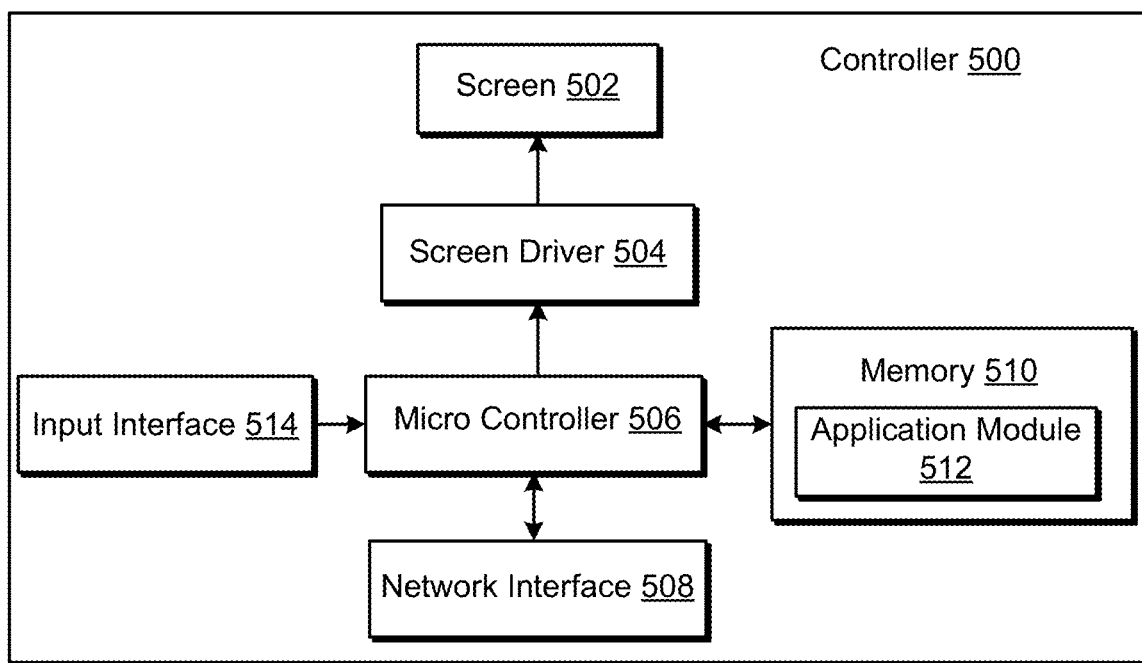
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b 802.11g, 802.11n, or 802.15, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an iPhone®, iPad® or any other smart phone or network-enabled device (e.g., a networked computer such as a PC or Mac®) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would need to manually and individually link each zone. The single command may include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Extending Media Playback

Figure 6:
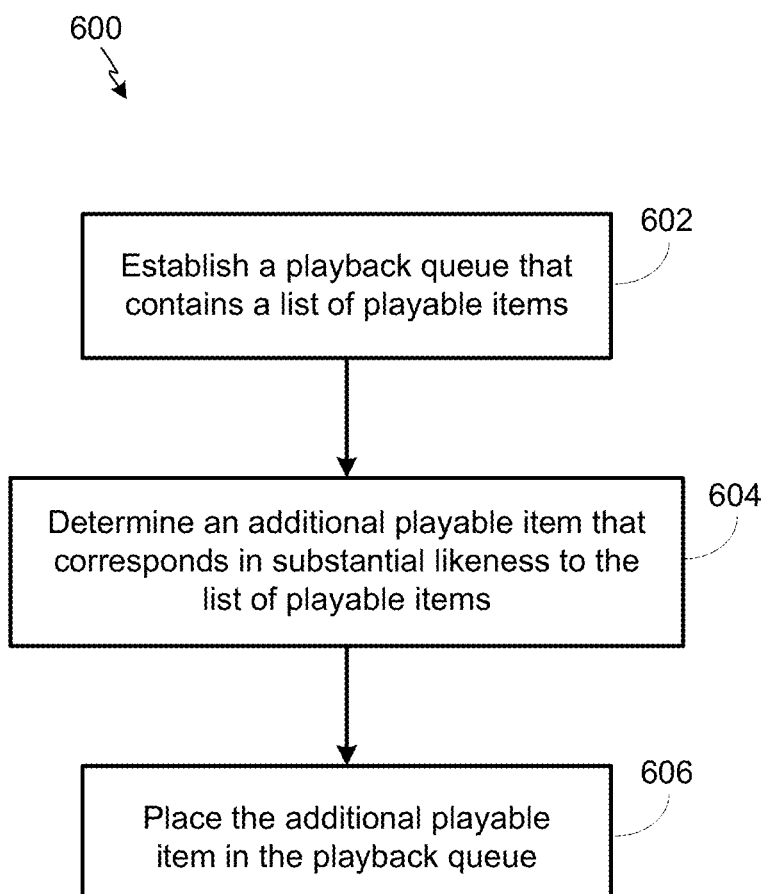
FIG. 6 shows a flow diagram according to an embodiment.

FIG. 6 shows an example process 600 for intelligently extending media playback according to an embodiment. The process 600 may be used for any type of media, including audio and video or both. Aspects of the process 600 may be implemented on a single device, such as a zone player or a controller, or a combination of devices, such as a zone player and a controller. Process 600 may further be implemented by a device that is neither a zone player nor a controller.

At block 602, a playback queue that contains a list of playable items is established. Using a music example, when a user makes a music selection, the music is added to a list of playable items. The list of playable items can include one or more items. An item can be a track, playlist, album, radio channel, or some other playable item. In some embodiments, the item is a pointer or identification of the track, playlist, album, radio channel, and so on, such that when playing, the zone player (or other playback device) retrieves the underlying content, usually in a streaming fashion from another device on a local network or a server via the cloud.

Figure 7:
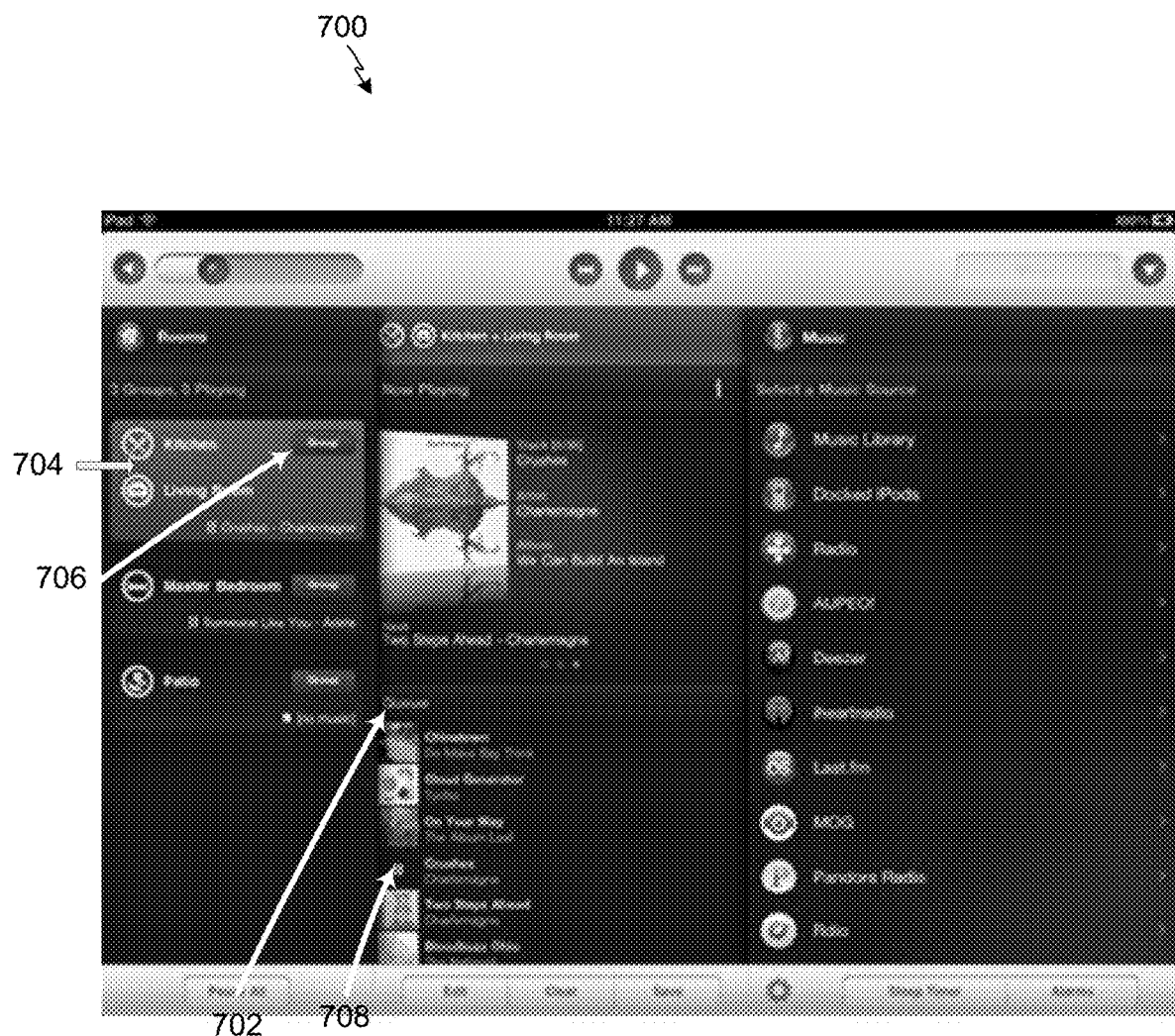
FIG. 7 shows an example user interface according to an embodiment.

Looking to FIG. 7, where an example controller user interface (UI) 700 is shown, a playback queue may be found at 702. In this example, the playback queue 702 corresponds to a zone group 704 currently comprised of the "Kitchen" and "Living Room." Note that a user can modify a particular zone group by selecting "Group" at 706 and then selecting which zones should be included in the group, effectively enabling the user to add or drop zones from the group. Each zone group can have its own playback queue, and modification of a zone group can happen while music is playing from the playback queue. The items in a playback queue may be played following an order (e.g., sequentially or in random order) depending on the user's selection or preference.

In the example of FIG. 7, a play indicator 708 appears to the left of the item currently playing in the playback queue (e.g., currently a pause symbol is shown that indicates the user can pause the play by selecting the symbol). When the current item ends, the next item in the queue starts to play, and play continues through the list until the queue is completed or some other action like "repeat" is selected. When a user adds a selection to a playback queue, he or she can choose to play them now, play them next, add them to the end of the queue, or play them now and clear the queue of previous music selections.

In an embodiment, the playback queue is established in memory at a zone player. It could be the memory of a zone player that is to play the content or another zone player. Looking at FIG. 4, for example, the playback queue may be stored in memory 410. In an embodiment, the playback queue, or some aspect, is provided to the controllers of a playback system so that the UI of the controllers can properly display the current system state to the user (e.g., to display the items in the playback queue to the user).

In another embodiment, the playback queue is established in memory at another device on a local playback network that is not a zone player. The other device may be a computing device that is a centralized device or some other device that is network connected to the playback system.

In yet another embodiment, the playback queue is established in memory at a controller. According to the embodiment, the controller maintains the playback queue. Looking to FIG. 5, for example, the playback queue may be stored in memory 510.

At block 604, an additional playable item that corresponds in substantial likeness to the list of playable items is determined. More than one additional playable item may be determined. In an embodiment, the option to extend playback is selected by a user in advance of the system extending the playback. This may be performed, for example, in a configuration window or via a single soft button offering this capability.

In an embodiment, the determination of the additional playable item is initiated based on a trigger. The trigger may be programmable by the user, hardcoded by the system developer, or a combination of both. For instance, block 604 might be programmed to occur as soon as a playable item is added to the queue or at some other time. In another instance, the system may sum the total play time of the playback queue and use that data to trigger block 604 (e.g., initiate block 604 when half of the play is done or when 3 songs are left to play).

In an embodiment, the determination of the additional item includes selecting the playable item to be in substantial likeness to the list of items in the playback queue. For instance, the system may look to material from the same artist, similar artists, channels based on the artist or similar artists. For example, if tracks from a Frank Sinatra album are in the queue, then the system might look to other Frank Sinatra albums or albums by artists like Sinatra. In another instance, the system may use an algorithm that results in an additional item. The algorithm may take into account certain attributes that describe a particular song. In yet another instance, the system may use an algorithm from a third-party service (e.g., Pandora, etc.) to provide additional items similar to the list of items in the playback queue.

In an embodiment, block 604 includes determining the additional playable item by searching accessible content via a network for the additional playable item. The playable item may be available from a local library (e.g., a shared folder on the home network), a music service, a saved playlist (e.g., a queue that was saved for future playback), radio, docked smart phones, a line-in connection to an external source, and so on.

In an embodiment, block 604 includes determining the additional playable item by providing a characteristic of the list of playable items to a third party service. For instance, if the playback queue contained music by Frank Sinatra, then the system may provide a service like Pandora or other third party provider with Frank Sinatra. Using that information, Pandora or a similar service can create a similar channel to that kind of music with their own proprietary engine. The newly created channel may be added to the playback queue. In addition, the newly created channel may be saved such that it can be accessed in the future.

At block 606, the additional playback item is placed in the playback queue. In an embodiment, the additional playable item is placed last in the playback queue. In another embodiment, the additional playable item is placed between two playable items of the list of playable items.

It is understood that according to an embodiment, the system can extend play time by automatically determining and/or playing audio content that is similar to what has been played by the particular player or group of players, versus just looking to the audio content in a playback queue. As such, the system and/or method may include determining what audio has been played via the playback device(s) and using that information to add content for play time extension. In some instances, this embodiment can provide a very accurate account of what kind of audio should be added and played to extend play time. In one embodiment, the system can look to the playback queue including song or track removals (and additions) over a designated time period. In another embodiment, the system may look to what audio has been played via the playback device(s) over a designated time period and not necessarily use the playback queue information.

In a further embodiment, both a location of a particular zone player being used as well as a time slot for when play time is to be extended may be considered when determining a smart playback list/extension of current playback items. For example, zone players in the kitchen zone may be playing audio from a queue at around 6:00 pm. When the queue runs out of audio content, the system may search a database (which may be stored in the cloud) for information on what has been played frequently over the last few weeks in the kitchen zone in the time frame of 5:00-7:00 pm. The system may then use audio track results from the search (or a top 10 audio track results, for example) for extending the playback queue.

VI. Conclusion

Embodiments described above provide for intelligently extending media playback. In an embodiment, a user can determine ahead of time whether he or she would like the system to shift to like music. The user might do this to extend media playback time without further effort by the user (or significant effort such as making additional user selections). This is particularly useful in scenarios when the user fills the playback queue with some playable items, but doesn't necessarily want the play to stop when the items are done playing. In some instances, with the feature(s) to extend playback turned on, the system will not stop playing audio until the user actually stops the playing via a controller or some other mechanism.

Additionally, in an embodiment, any queue in the system can be extended for playback, if so desired. For example, a queue corresponding to a zone, zone group, or party mode (all zones playing in synchrony) may use the playback extension feature(s) described herein.

According to an embodiment, a playback queue for an audio player is established. The playback queue contains one or more playable items. At least one additional playable item that corresponds in substantial likeness to the list of playable items is determined and placed in the playback queue, which intelligently extends play time.

According to another embodiment, unlike a traditional music queue where the music stops playing when a list of songs in the queue has been played or exhausted (e.g., repeated several times), the system automatically shifts to audio that is like the audio in the queue and the similar audio continues to play.

According to yet another embodiment, in addition to placing extra playable items at the end of a playback queue, or instead of, the system can place a playable item in between two playable items already in the playback queue. In other words, the system can be configured to inject additional playable items throughout the playback queue.

According to some embodiments, the playable item that is to be added to extend play time corresponds in substantial likeness to the list of playable items already in the queue and/or played. Substantial likeness is defined herein as having an identifiable similarity.

The description above discloses various example systems, methods, apparatus, and articles of manufacture including, among other components, firmware and/or software executed on hardware. However, such examples, like those shown and described with respect to FIGS. 1 through 7, are merely illustrative and should not be considered as limiting. Further, it is contemplated that any or all of these firmware, hardware, and/or software components can be embodied exclusively in hardware, exclusively in software, exclusively in firmware, or in any combination of hardware, software, and/or firmware. Accordingly, while the above description provides the reader with example systems, methods, apparatus, and/or articles of manufacture, the examples provided are not the only way(s) to implement such systems, methods, apparatus, and/or articles of manufacture, such as understood by a person of ordinary skill in the art.

Additionally, reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

The invention claimed is:

1. A computing system comprising:
a communications interface;
at least one processor; and
at least one non-transitory computer-readable medium comprising program instructions that are executable by the at least one processor such that the computing system is configured to:
receive, via the communications interface over one or more networks comprising a wide area network, data indicating a container of audio tracks, wherein the container comprises one of (a) a playlist, or (b) an album;
add the container of audio tracks to a queue corresponding to at least one playback device, wherein the queue is stored in data storage of the computing system and comprises an ordered list of audio tracks;
cause, via the communications interface over at least the wide area network of the one or more networks, the at least one playback device to play back audio tracks according to the queue;
determine additional audio tracks that correspond in substantial likeness to the audio tracks in the container; and
when the at least one playback device finishes playback of the queue, add the determined additional audio tracks to the queue such that playback time of the queue is extended.

2. The computing system of claim 1, wherein the at least one playback device comprises a first playback device and a second playback device in a synchrony group, and wherein the program instructions that are executable by the at least one processor such that the computing system is configured to cause the at least one playback device to play back the queue comprise program instructions that are executable by the at least one processor such that the computing system is configured to:

cause the first playback device and the second playback device to play back the queue in synchrony.

3. The computing system of claim 1, wherein the at least one non-transitory computer-readable medium further comprises program instructions that are executable by the at least one processor such that the computing system is configured to:
  determine that the at least one playback device has finished playback of the queue based on (a) the at least one playback device finishing playback of a last audio track in the queue or (b) the at least one playback device progressing through all audio tracks in the queue.

4. The computing system of claim 1, wherein the at least one non-transitory computer-readable medium further comprises program instructions that are executable by the at least one processor such that the computing system is configured to:
  determine that an automatic playback extension feature is enabled for the at least one playback device, wherein, when the automatic playback extension feature is disabled, the computing system is configured to forego adding additional audio tracks to the queue when the at least one playback device finishes playback of the queue.

5. The computing system of claim 1, wherein the program instructions that are executable by the at least one processor such that the computing system is configured to determine the additional audio tracks that correspond in substantial likeness to the audio tracks in the container comprise program instructions that are executable by the at least one processor such that the computing system is configured to:
  determine the additional audio tracks based on corresponding characteristics of the audio tracks in the container and audio tracks in one or more additional playlists.

6. The computing system of claim 5, wherein the corresponding characteristics include at least one of (i) container name, (ii) artist name, or (iii) genre.

7. The computing system of claim 1, wherein the program instructions that are executable by the at least one processor such that the computing system is configured to cause the at least one playback device to play back audio tracks according to the queue comprise program instructions that are executable by the at least one processor such that the computing system is configured to:
  cause one or more content delivery servers to stream data representing the audio tracks to the at least one playback device.

8. The computing system of claim 1, wherein the at least one non-transitory computer-readable medium further comprises program instructions that are executable by the at least one processor such that the computing system is configured to:
  cause, via the communications interface, a user device to display graphical representations of the additional audio tracks.

9. A method to be performed by a computing system, the method comprising:
  receiving, via a communications interface over one or more networks comprising a wide area network, data indicating a container of audio tracks, wherein the container comprises one of (a) a playlist, or (b) an album;
  adding the container of audio tracks to a queue corresponding to at least one playback device, wherein the queue is stored in data storage of the computing system and comprises an ordered list of audio tracks;
  causing, via the communications interface over at least the wide area network of the one or more networks, the at least one playback device to play back audio tracks according to the queue;
  determining additional audio tracks that correspond in substantial likeness to the audio tracks in the container; and
  when the at least one playback device finishes playback of the queue, adding the determined additional audio tracks to the queue such that playback time of the queue is extended.

10. The method of claim 9, wherein the at least one playback device comprises a first playback device and a second playback device in a synchrony group, and wherein the method further comprises:
  causing the first playback device and the second playback device to play back the queue in synchrony.

11. The method of claim 9, further comprising:
  determining that the at least one playback device has finished playback of the queue based on (a) the at least one playback device finishing playback of a last audio track in the queue or (b) the at least one playback device progressing through all audio tracks in the queue.

12. The method of claim 9, further comprising:
  determining that an automatic playback extension feature is enabled for the at least one playback device, wherein, when the automatic playback extension feature is disabled, the computing system is configured to forego adding additional audio tracks to the queue when the at least one playback device finishes playback of the queue.

13. The method of claim 9, wherein determining the additional audio tracks that correspond in substantial likeness to the audio tracks in the container comprises:
  determining the additional audio tracks based on corresponding characteristics of the audio tracks in the container and audio tracks in one or more additional playlists.

14. The method of claim 13, wherein the corresponding characteristics include at least one of (i) container name, (ii) artist name, or (iii) genre.

15. The method of claim 9, wherein causing the at least one playback device to play back audio tracks according to the queue comprises:
  causing one or more content delivery servers to stream data representing the audio tracks to the at least one playback device.

16. The method of claim 9, further comprising:
  causing, via the communications interface, a user device to display graphical representations of the additional audio tracks.

17. A tangible, non-transitory computer-readable medium comprising program instructions that are executable by at least one processor such that a computing system is configured to:
  receive, via a communications interface over one or more networks comprising a wide area network, data indicating a container of audio tracks, wherein the container comprises one of (a) a playlist, or (b) an album;
  add the container of audio tracks to a queue corresponding to at least one playback device, wherein the queue is stored in data storage of the computing system and comprises an ordered list of audio tracks;

cause, via the communications interface over at least the wide area network of the one or more networks, the at least one playback device to play back audio tracks according to the queue;

determine additional audio tracks that correspond in substantial likeness to the audio tracks in the container; and when the at least one playback device finishes playback of the queue, add the determined additional audio tracks to the queue such that playback time of the queue is extended.

18. The tangible, non-transitory computer-readable medium of claim 17, wherein the at least one playback device comprises a first playback device and a second playback device in a synchrony group, and wherein the program instructions that are executable by the at least one processor such that the computing system is configured to cause the at least one playback device to play back the queue comprise program instructions that are executable by the at least one processor such that the computing system is configured to:

cause the first playback device and the second playback device to play back the queue in synchrony.

19. The tangible, non-transitory computer-readable medium of claim 17, wherein the non-transitory computer-readable medium further comprises program instructions that are executable by the at least one processor such that the computing system is configured to:

determine that an automatic playback extension feature is enabled for the at least one playback device, wherein, when the automatic playback extension feature is disabled, the computing system is configured to forego adding additional audio tracks to the queue when the at least one playback device finishes playback of the queue.

20. The tangible, non-transitory computer-readable medium of claim 17, wherein the program instructions that are executable by the at least one processor such that the computing system is configured to determine the additional audio tracks that correspond in substantial likeness to the audio tracks in the container comprise program instructions that are executable by the at least one processor such that the computing system is configured to:

determine the additional audio tracks based on corresponding characteristics of the audio tracks in the container and audio tracks in one or more additional playlists.

* * * * *